US012627399B2

(12) United States Patent
Zhao et al.

(10) Patent No.: US 12,627,399 B2
(45) Date of Patent: May 12, 2026

(54) BLIND DETECTION METHOD, DEVICE, TERMINAL AND STORAGE MEDIUM

(71) Applicant: SANECHIPS TECHNOLOGY CO., LTD, Shenzhen (CN)

(72) Inventors: Lijuan Zhao, Shenzhen (CN); Junling Zhang, Shenzhen (CN)

(73) Assignee: SANECHIPS TECHNOLOGY CO., LTD, Shenzhen (CN)

( * ) Notice: Subject to any disclaimer, the term of this patent is extended or adjusted under 35 U.S.C. 154(b) by 631 days.

(21) Appl. No.: 18/015,756

(22) PCT Filed: Aug. 23, 2021

(86) PCT No.: PCT/CN2021/114036
§ 371 (c)(1),
(2) Date: Jan. 12, 2023

(87) PCT Pub. No.: WO2022/042473
PCT Pub. Date: Mar. 3, 2022

(65) Prior Publication Data
US 2023/0275690 A1 Aug. 31, 2023

(30) Foreign Application Priority Data
Aug. 25, 2020 (CN) .......................... 202010865334.0

(51) Int. Cl.
*H04L 1/00* (2006.01)
*H04L 1/1607* (2023.01)
(Continued)

(52) U.S. Cl.
CPC .......... *H04L 1/0038* (2013.01); *H04L 1/1642* (2013.01); *H04W 16/28* (2013.01); *H04W 56/0015* (2013.01)

(58) Field of Classification Search
CPC .... H04L 1/0038; H04L 1/1642; H04W 16/28; H04W 56/0015
See application file for complete search history.

(56) References Cited

U.S. PATENT DOCUMENTS

2018/0227867 A1* 8/2018 Park ........................ H04L 5/005
2019/0254034 A1* 8/2019 Liu ........................ H04W 92/10
(Continued)

FOREIGN PATENT DOCUMENTS

CN 102271023 A 12/2011
CN 109474369 A 3/2019
(Continued)

OTHER PUBLICATIONS

WIPO, International Search Report issued on Nov. 1, 2021.
Indian Patent Office, OA1 dated May 8, 2024, for corresponding IN application No. 202317015294.
(Continued)

*Primary Examiner* — Jackie Zuniga Abad
(74) *Attorney, Agent, or Firm* — Li & Cai Intellectual Property (USA) Office

(57) ABSTRACT
A blind detection method and apparatus, a terminal, and a storage medium. The method comprises: according to system frame number (SFN) information, demasking physical broadcast channel (PBCH) information received by a synchronization signal/PBCH block (SSB) in a target beam direction in at least one synchronization signal period within one transmission time interval, so as to obtain at least one group of demasked sequences; determining a combined sequence according to the at least one group of demasked sequences; checking a decoding result of the combined sequence; and when the check succeeds, extracting a master information block (MIB) from the decoding result according to the SFN information, so as to complete blind detection of the PBCH information.

15 Claims, 5 Drawing Sheets

(51) Int. Cl.
*H04W 16/28* (2009.01)
*H04W 56/00* (2009.01)

(56) References Cited

U.S. PATENT DOCUMENTS

| | | | |
|---|---|---|---|
| 2020/0187159 A1* | 6/2020 | Ko | H04L 5/0051 |
| 2020/0196254 A1 | 6/2020 | Kerhuel et al. | |
| 2020/0220662 A1 | 7/2020 | Park | |
| 2020/0337002 A1* | 10/2020 | Ko | H04L 5/0016 |

FOREIGN PATENT DOCUMENTS

| | | |
|---|---|---|
| CN | 110890940 A | 3/2020 |
| JP | 2020508000 A | 3/2020 |
| JP | 2020520578 A | 7/2020 |
| KR | 20200060515 A | 5/2020 |
| WO | WO2019052443 A1 | 3/2019 |
| WO | WO 2019098919 A1 | 5/2019 |

OTHER PUBLICATIONS

European Patent Office, the extended European Search Report dated Aug. 26, 2024, for corresponding IN application No. 21860308.2.

ZTE, et al., "Coding scheme for PBCH ", 3GPP Draft, issued on Nov. 18, 2017.

Intel Corporation, "NR PBCH Design", 3GPP Draft, issued on Aug. 20, 2017.

Intel Corporation, "Enhancements to initial access and mobility for NR-unlicensed", 3GPP Draft, issued on Feb. 22, 2019.

Japan Patent Office, first Office action dated Jan. 9, 2024, for corresponding JP application No. 2022-572723.

Ericsson, "Arrangement of PBCH Fields for Polar Codes", 3GPP TSG RAN WG1#91 R1-1721461 dated 2017.

Intel, "WF on srcambling for NR RBCH", 3GPP TSG RAN WG1#90 R1-1715163 dated 2017.

Intel Corporation, "Enhancements to initial access and mobility for NR-unlicensed", 3GPP TSG RAN WG1#97 R1-1906786 dated May 2019.

Intel Corporation, "Time Index Signaling for SS Blocks", 3GPP TSG RAN WG1 adhoc_NR_AH_1706 R1-1711647 dated 2017.

* cited by examiner

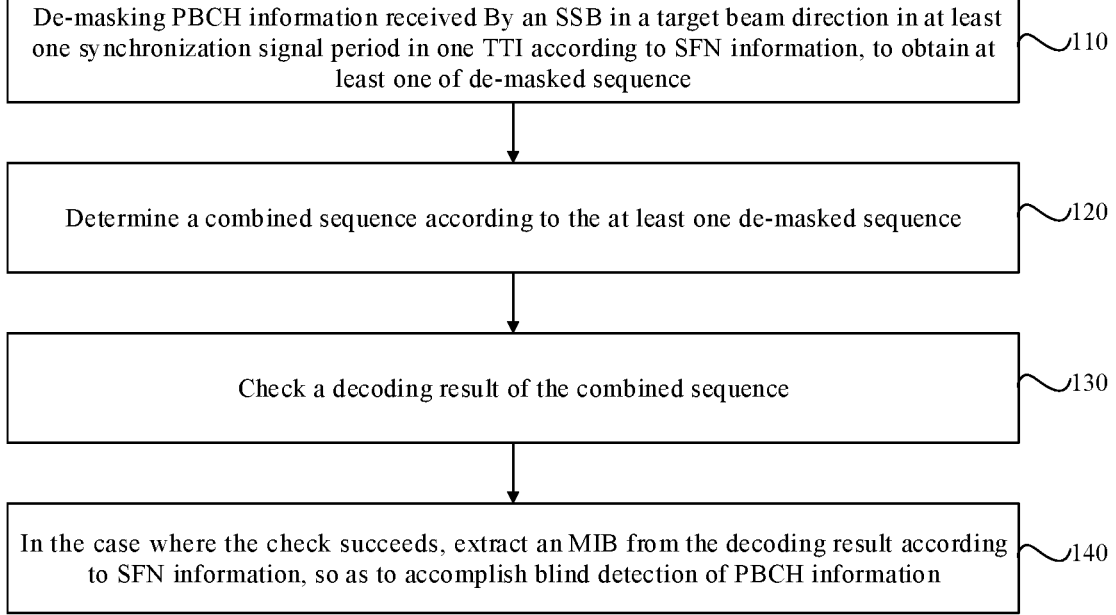

De-masking PBCH information received By an SSB in a target beam direction in at least one synchronization signal period in one TTI according to SFN information, to obtain at least one of de-masked sequence ∿110

Determine a combined sequence according to the at least one de-masked sequence ∿120

Check a decoding result of the combined sequence ∿130

In the case where the check succeeds, extract an MIB from the decoding result according to SFN information, so as to accomplish blind detection of PBCH information ∿140

FIG. 1

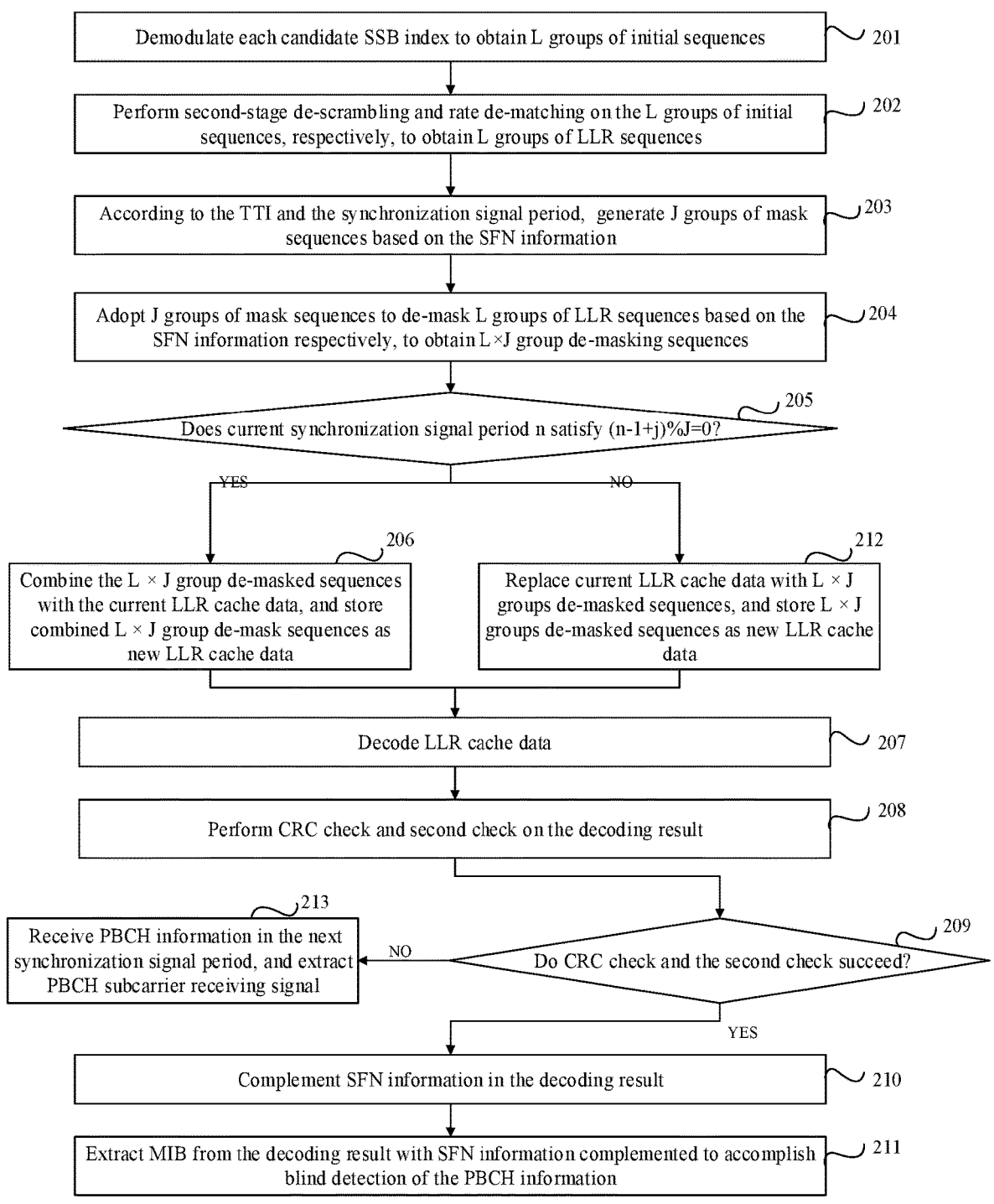

Demodulate each candidate SSB index to obtain L groups of initial sequences ~ 201

Perform second-stage de-scrambling and rate de-matching on the L groups of initial sequences, respectively, to obtain L groups of LLR sequences ~ 202

According to the TTI and the synchronization signal period, generate J groups of mask sequences based on the SFN information ~ 203

Adopt J groups of mask sequences to de-mask L groups of LLR sequences based on the SFN information respectively, to obtain L ×J group de-masking sequences ~ 204

Does current synchronization signal period n satisfy (n-1+j)%J=0? ~ 205

YES          NO

Combine the L × J group de-masked sequences with the current LLR cache data, and store combined L × J group de-mask sequences as new LLR cache data ~ 206

Replace current LLR cache data with L × J groups de-masked sequences, and store L × J groups de-masked sequences as new LLR cache data ~ 212

Decode LLR cache data ~ 207

Perform CRC check and second check on the decoding result ~ 208

Receive PBCH information in the next synchronization signal period, and extract PBCH subcarrier receiving signal ~ 213          NO          Do CRC check and the second check succeed? ~ 209          YES Complement SFN information in the decoding result ~ 210

Extract MIB from the decoding result with SFN information complemented to accomplish blind detection of the PBCH information ~ 211

BLIND DETECTION METHOD, DEVICE, TERMINAL AND STORAGE MEDIUM

CROSS-REFERENCING OF RELATED APPLICATIONS

The present disclosure claims the priority of Chinese patent application No. 202010865334.0, filed on Aug. 25, 2020, entitled "Blind detection method, device, terminal, and storage medium" in the China National Intellectual Property Administration, the entire contents of which is incorporated here by reference.

TECHNICAL FIELD

Embodiments of the disclosure relate to, but are not limited to, the technologies of wireless communication networks, and in particular, to a blind detection method, device, terminal, and storage medium.

BACKGROUND

The Before a User Equipment (UE) accesses a cell, it needs to acquire Master Information Block (MIB) of the cell by detecting a Physical Broadcast Channel (PBCH) first to know how the cell is configured, so as to correctly work in the cell. In New Radio (NR) systems, PBCH payload is mapped to a Synchronization Signal/PBCH Block (SSB) for transmission through interleaving, scrambling, and checking, for example. The UE carries out blind detection on the PBCH information to obtain information such as MIB, SSB index, and can further complete radio frame timing, half-frame timing, time slot timing and the like.

In the blind detection process, if soft combining is performed on different SSB sets and relevant information of each SSB in each SSB set, the combining cannot be effectively performed as System Frame Number (SFN) information of different periods is different. The soft information obtained by direct combination has a lower signal-to-noise ratio, a large number of groups is required in the blind detection, the calculation thereof is complex, and the blind detection efficiency is low.

SUMMARY

Embodiments of the disclosure provide a blind detection method, device, terminal, and storage medium to improve a signal-to-noise ratio of information combination and efficiency of blind detection.

An embodiment of the disclosure provides a blind detection method, including: de-masking Physical Broadcast Channel (PBCH) information received by a Synchronization Signal Block (SSB) in a target beam direction in at least one synchronization signal period within one Transmission Time Interval (TTI) according to System Frame Number (SFN) information, to obtain at least one group of de-masked sequences; determining a combined sequence according to the at least one group of de-masked sequences; checking a decoding result of the combined sequence; and responsive to determining that the check succeeds, extracting a Master Information Block (MIB) from the decoding result according to the SFN information so as to accomplish blind detection of the PBCH information.

An embodiment of the disclosure further provides a blind detection device, including: a de-masking module, configured to de-mask Physical Broadcast Channel (PBCH) information received by a Synchronization Signal Block (SSB) in a target beam direction in at least one synchronization signal period within one Transmission Time Interval (TTI) according to System Frame Number (SFN) information, to obtain at least one group of de-masked sequences; a combining module, configured to determine a combined sequence according to the at least one group of de-masked sequences; a checking module, configured to check a decoding result of the combined sequence; and a extracting module, configured to, responsive to determining that the check succeeds, extract a Master Information Block (MIB) from the decoding result according to the SFN information, so as to accomplish blind detection of the PBCH information.

An embodiment of the present disclosure also provides a terminal, including: at least one processor; and a storage device, storing at least one program, wherein the at least one program, when executed by the at least one processor, causes the at least one processor to implement the blind detection method as set forth above.

An embodiment of the present disclosure also provides a computer-readable storage medium, storing a computer program, wherein the program, when executed by a processor, implements the blind detection method as set forth above.

The embodiments of the disclosure provide a blind detection method, a blind detection device, a terminal and a storage medium. The method includes: according to the SFN information, de-masking the PBCH information received through the SSB in the target beam direction in at least one synchronization signal period within one transmission time interval, to obtain at least one group of de-masked sequences; determining the combined sequence according to the at least one group of de-masked sequences; checking a decoding result of the combined sequence; and in the case where the check succeeds, extracting the MIB from the decoding result according to the SFN information so as to accomplish the blind detection of the PBCH information. By means of demasking, the difference of the PBCH information received by the same SSB in different synchronization signal periods within one transmission time interval is eliminated, such that soft combination is realized, and a signal-to-noise ratio of the information is increased. Moreover, the PBCH information received by an SSB in a target beam direction in different synchronization signal periods within one transmission time interval is combined, such that the number of times of combination and the number of groups used in blind detection are reduced, thereby improving the efficiency of blind detection.

BRIEF DESCRIPTION OF DRAWINGS

FIG. 1 is a flowchart illustrating a blind detection method according to an embodiment of the disclosure;

FIG. 4 is a flowchart illustrating a blind detection method according to another embodiment of the disclosure;

DETAIL DESCRIPTION OF EMBODIMENTS

Figure 2:
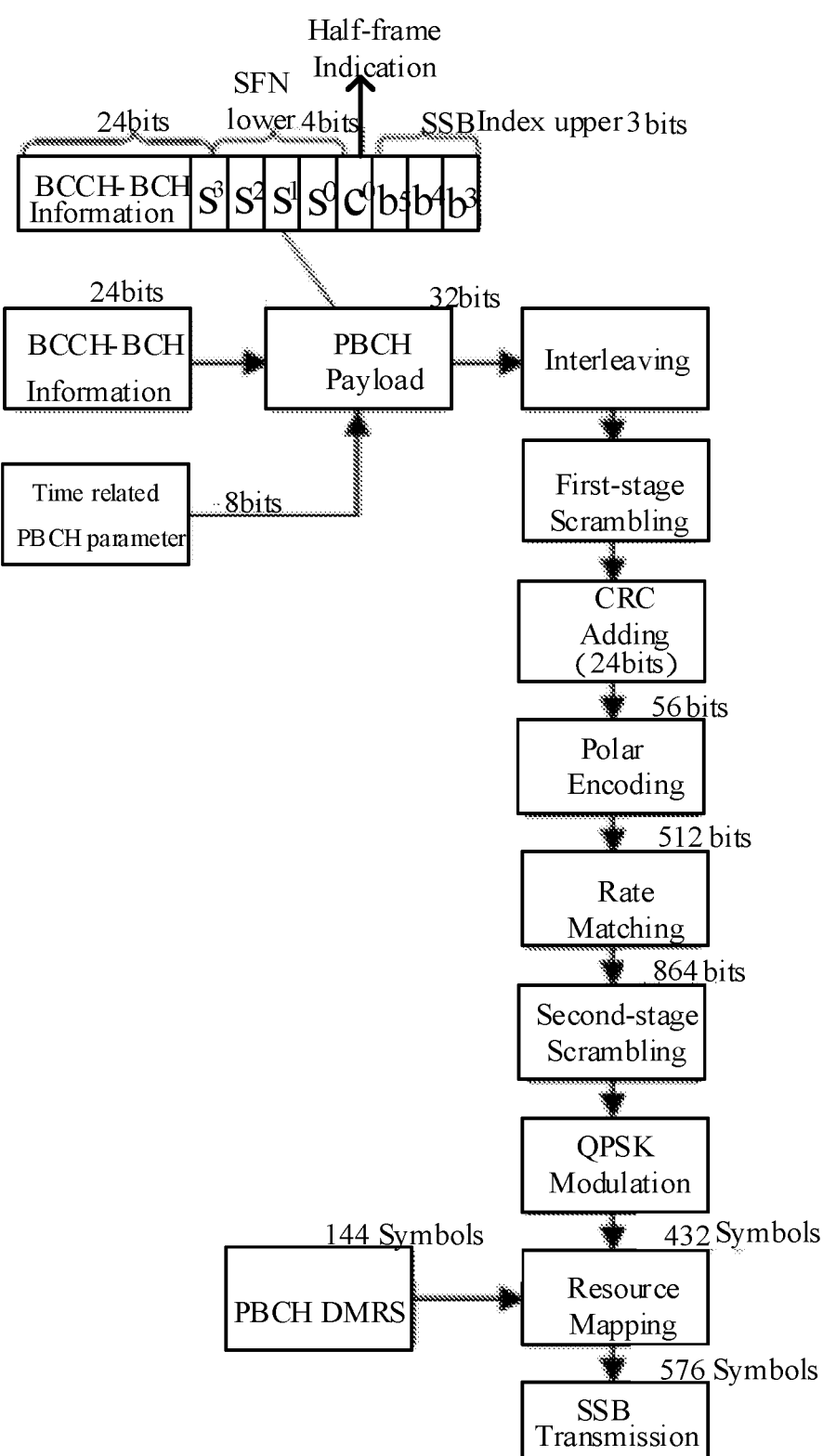
FIG. 2 is a schematic diagram of a mapping between specific bits and SSB according to an embodiment of the disclosure.

The disclosure will be described hereinafter with reference to the companying figures and embodiments. It should be appreciated that the embodiments described herein are provided only for explaining, rather than limiting the present disclosure. It should be noted that, in the present disclosure, the embodiments and the features of the embodiments can be arbitrarily combined with each other if there is no conflict. It also should be noted that, for the sake of description, only some of the structures associated with the present disclosure, rather than the entire structure, are shown in the companying figures.

In the NR system, each SSB includes a primary synchronization signal, a secondary synchronization signal, a PBCH, and a Demodulation Reference Signal (DMRS) corresponding to the PBCH, and corresponds to a single beam direction. In each beam direction, a base station transmits a plurality of SSBs in a synchronization signal period in a beam polling manner. The SSBs in the synchronization signal period are located in a half radio frame and form an SSB set. The beam direction of the SSBs in a single SSB set covers a whole cell. The UE can determine a physical cell ID and align a SSB symbol boundary of the UE beam by detecting the primary synchronization signal and the secondary synchronization signal. On this basis, the blind detection is carried out for the PBCH information (i.e., for PBCH). The UE can obtain MIB, SFN information, half-frame indication and SSB index by detecting PBCH, thereby completing radio frame timing and half-frame timing. In addition, the UE can determine the time slot and symbol of the current synchronization signal according to the SSB index and a pattern of the SSB set used in the current frequency band, thereby completing slot timing.

The PBCH has a TTI of 80 milliseconds (ms), and the synchronization signal period can be 5 ms, 10 ms, 20 ms, for example. Accordingly, 16, 8 or 4 synchronization signal periods can be included in a single TTI.

In order to adapt to the characteristics of the high-frequency multi-beam of the NR system, a single SSB set contains at most Lmax SSBs. the value of Lmax is related to a size of a carrier frequency. In the case where the carrier frequency is less than 3 GHz, a single SSB set includes Lmax=4 SSBs; in the case where the carrier frequency is greater than 3 GHz and less than 6 GHz, a single SSB set includes Lmax=8 SSBs; in the case where the carrier frequency is greater than 6 GHz, a single SSB set includes Lmax=64 SSBs. Each SSB is formed of 4 Orthogonal Frequency Division Multiplexing (OFDM) symbols, and includes a portion of PBCH. Thus, a TTI can contain 16×Lmax, 8×Lmax, or 4×Lmax equal portions of PBCH.

In a Long-Term Evolution (LTE) system, the PBCH received for one-time can be directly demodulated. If a demodulation of the currently received PBCH is successful, the demodulation of the PBCH will be terminated; if the demodulation of the currently received PBCH is failed, a next-time reception will be performed and an attempt will be made to combine the next-time received PBCH with the currently received PBCH. Since the two received PBCHs may belong to different TTIs, the combination is not allowed in this case. Therefore, two groups of blind detection need to be attempted, i.e., an attempt will be made to combine or not to combine the two received PBCHs.

For example, the currently received PBCH is PBCH1. If the demodulation of PBCH1 is failed, PBCH2 will be received successively. After PBCH2 is received, since PBCH1 and PBCH2 may belong to different TTIs, there are two groups of blind detection. Therefore, an attempt is made to combine PBCH1 and PBCH2 or to demodulate PBCH2 separately.

If the two received PBCHs are still not successfully demodulated upon the two groups of blind detection combinations, then PBCH3 will be received successively and an attempt will be made to demodulate PBCH3 separately or to combine PBCH3 with at least one of PBCH1 and PBCH2. There are four possible groups of blind detection, which are PBCH1 and PBCH3; PBCH2 and PBCH3; PBCH1, PBCH2, and PBCH3; and PBCH 3.

Similarly, if the three received PBCHs are still not successfully demodulated upon the four groups of blind detection, then PBCH4 will be received successively and an attempt will be made to demodulate PBCH4 separately or to combine PBCH4 with at least one of PBCH1, PBCH2 and PBCH3. There are eight possible groups of blind detection.

In the NR system, SFN information in different periods is also different, so that PBCH cannot be combined effectively. The signal-to-noise ratio of soft information obtained by direct combination is relatively low, which cannot guarantee accurate demodulation of PBCH. Moreover, a single TTI may contain 16×Lmax, 8×Lmax, or 4×Lmax equal portions of PBCH, such that a large number of groups of blind detection is required, the amount of calculation is increased, the efficiency of blind detection is reduced, and high complexity of demodulation of PBCH is required by terminal.

It is assumed that the period of the synchronization signal is 20 ms in the process of initial access of the UE. Unless otherwise indicated, in the embodiment of the disclosure, the process of the blind detection of the PBCH information will be described by taking the period of 20 ms (that is, a TTI includes 4 synchronization signal periods and 4×Lmax equal portions of PBCH) as an example.

In an embodiment of the disclosure, there is provided a blind detection method, which, by de-masking, can eliminate differences in PBCH information received in different synchronization signal periods through SSB, thereby implementing soft combination and improving the signal-to-noise ratio of information combination; and which, by combining the PBCH information received by the SSB in the target beam direction in a plurality of synchronous signal periods in a transmission time interval, can reduce the times of combining and the number of groups of blind detection, thereby improving the efficiency of blind detection.

FIG. 1 is a flowchart of a blind detection method according to an embodiment of the disclosure. The method can be applied to a terminal. As shown in FIG. 1, the method according to this embodiment includes Steps 110 to 140.

In Step 110, PBCH information received by an SSB in a target beam direction in at least one synchronization signal period within a transmission time interval (TTI) is de-masked according to SFN information, to obtain at least one group of de-masked sequences.

In Step 120, a combined sequence is determined according to the at least one group of de-masked sequences.

In this embodiment, the PBCH information received by the SSB in the target beam direction (i.e., the beam direction aligned with the UE) in the at least one synchronization signal period within a single TTI of the PBCH is de-masked based on the SFN information, so as to eliminate the differences of the SFN information. In other words, different bits in the SFN information are unified to obtain the demasked sequences for the SSB, such that the PBCH information received by the SSB in different synchronization signal periods is kept consistent, thereby establishing a basis for realizing soft combination.

In Step 130, a decoding result of the combined sequence is checked.

In Step 140, when the check succeeds, an MIB is extracted from the decoding result according to the SFN information, so as to accomplish blind detection of the PBCH information.

In this embodiment, on the basis of soft combination of the de-masked sequence of the SSB aligned with the beam direction of the UE within one TTI, the combined sequence is subjected to Polar-decoding and checking. A successful detection of the PBCH can be determined if the checking is successful. In the decoding result obtained by Polar-decoding the combined sequence, since the decoding result does not carry the difference information of the SFN information of the SSB in different synchronization signal periods, accurate MIB information cannot be extracted and radio frame timing and half-frame timing also cannot be completed. In the process of extracting the MIB information, according to this embodiment, the information relevant to the SFN information eliminated in the de-masking process is considered, such that an accurate and complete decoding result can be obtained to extract the accurate MIB information and complete the blind detection of the PBCH information.

It should be noted that the combined sequence can be obtained by combining multiple groups of de-masked sequences, or can be formed by a group of de-masked sequences. For example, a first group of de-masked sequences obtained in the first synchronization signal period within a TTI can be directly used as the combined sequence. In the initial synchronization process, the UE does not know which SSB is in the beam direction aligned with the UE, i.e., does not know an index of the SSB in the beam direction aligned with the UE. Therefore, indexes of the SSBs need to be traversed, and the SSBs are subjected to de-masking, decoding, and checking until the check is successful. Then the desired SSB is discovered.

In an embodiment, Step 110 further includes:

Step 1110: generating J groups of mask sequences based on the SFN information according to the TTI and the synchronous signal period, wherein J is a positive integer;

Step 1120: determining L candidate SSB indexes according to lower 3 bits of an SSB index or determining L candidate SSB indexes according to lower 2 bits of an SSB index and a half-frame indication bit, wherein L is a positive integer, and each of the candidate SSB indexes corresponds to a PBCH DMRS sequence and a second-stage scrambling sequence;

Step 1130: calculating a group of Log-Likelihood Ratio (LLR) sequences for each of the candidate SSB indexes, respectively; and Step 1140: adopting the J groups of mask sequences to de-mask the LLR sequences, respectively, to obtain J groups of de-masked sequences until the check succeeds.

In this embodiment, the number of mask sequences is J, J being equal to the number of synchronization signal periods included in the TTI. For example, $J=80/20=4$ when the synchronization signal period is 20 ms. Each SSB candidate index corresponds to a group of LLR sequences. The LLR sequence is obtained by performing channel estimation on the PBCH according to DMRS sequence generated by the SSB candidate index and performing equalization, demodulation, second-stage descrambling and rate de-matching on a channel estimation result. The LLR sequence can be used for soft combination after being subjected to de-masking.

In this embodiment, the number of the candidate SSB indexes is L, and the number of groups of the LLR sequences is also L.

The value of "L" can be determined according to specific bits in the SFN information. For example, the initialization of PBCH DMRS sequence is related to lower 3 bits of SSB index, or to lower 2 bits of SSB index and a half-frame indication (3 bits in total and denoted as 3 bits). Therefore, by traversing values of the associated 3 bit, the number of SSBs can be determined to be $L=2^3=8$. For each SSB, the PBCH is subjected to the channel estimation according to the corresponding DMRS sequence to obtain a signal at its subcarrier position and the signal is equalized and demodulated to obtain L groups of initial sequences (having a length of 864). Subsequently, each group of initial sequence is subjected to second-stage descrambling and rate de-matching by using the corresponding second-stage scrambling sequence to obtain a corresponding LLR sequence (having a length of 512). In this embodiment, the lower 3 bits of the SSB index and the half-frame indication bit can take a value of 0 or 1, so that the number of the candidate SSB indexes in each synchronization signal period is $L=8$.

The LLR sequences is de-masked by using the J groups of mask sequences, respectively, to obtain Lx J groups of de-masked sequences.

It should be noted that the operation order of Step 1110 and Step 1130 is not limited in this embodiment. In addition, if the 1st SSB index and jth group of mask sequences are gained when the check is successful, stages of decoding and extracting the MIB based on the SFN information will be entered without further de-masking the remaining SSB indexes.

In the following embodiments, for the sake of description, the SFN information (10 bits in total) is denoted as $(s9, \ldots, s0)$ in a high-to-low order, 1 bit of the half-frame indication is denoted as c0, and 6 bit of the SSB index is denoted as $(b5, \ldots, b0)$ in a high-to-low order.

FIG. 2 is a schematic diagram of a mapping between specific bits and SSB according to an embodiment of the disclosure. In the NR system, a cell sends system information to all UEs in the cell through a logical channel, and a Broadcast Control Channel (BCCH) of the logical channel is mapped to a Broadcast Channel (BCH) of a transmission channel and a Downlink Shared Channel (DL-SCH). As shown in FIG. 2, the PBCH payload is inclusive of BCCH-BCH information (24 bits) and time-dependent PBCH parameters (8 bits), 32 bits in total. The time-dependent PBCH parameters include lower 4 bits of SFN information (s3, s2, s1, and s0), 1-bit half-frame indication (c0), and upper 3 bits of SSB index (b5, b4, and b3). 32 bits of the PBCH payload is subjected to interleaving, first-stage scrambling, 24-bit added Cyclic Redundancy Check (CRC), Polar-codes encoding (512 bits), rate matching (864 bits), second-stage scrambling, Quadrature Phase Shift Keying (QPSK) modulation (432 symbols), and mapped by resource to an SSB (576 symbols) together with corresponding DMRS (144 symbols) for transmission. The lower 3 bits of the SFN information corresponding to the SSBs in the different synchronous signal periods are different, or the lower 2 bits of the SFN information and half-frame indication corresponding to the SSBs in different synchronous signal periods are different. By means of the de-masking based on the SFN information, the difference of the SFN information (or the SFN information and the half-frame indication) can be eliminated in the soft combination process; after the processes of decoding and checking are completed, SFN information (or SFN information and half-frame indication) of the SSB in the beam aligned to UE in different synchronous signal periods is retrieved in the process of extracting the MIB, so as to extract accurate MIB information.

In an embodiment, Step 1110 further includes:

generating a bit sequence according to each value of specific bits, respectively, wherein the specific bits belong to the lower 3 bits of the SFN information and the half-frame indication bit; and performing first-stage scrambling, Cyclic Redundancy Check (CRC) adding and Polar-codes encoding on the bit sequence to obtain the J groups of mask sequences.

In this embodiment, J groups of mask sequences based on SFN information are generated according to specific bits, for de-masking LLR sequences of L candidate SSB indexes. The specific bits are denoted as (k3, k2, k1, k0).

In the case that the synchronization signal period is 5 ms, the SFN information in the MIB information within the same SSB has different lower 3-bit and different half-frame indication in different synchronization signal periods within one TTI. The 4 bits need to be specially processed, and are marked as specific bits: (k3, k2, k1, k0)=(s2, s1, s0, c0).

In the case that the synchronization signal period is 10 ms, the SFN information in the MIB information within the same SSB has different lower 3 bits and the same half-frame indication in different synchronization signal periods within one TTI, and the specific bits are denoted as (k3, k2, k1, k0)=(s2, s1, s0, 0). Since the half-frame indication bits are the same in different synchronization signal periods, the half-frame indication bit can be denoted as 0, which indicates non-difference.

In the case that the synchronization signal period is 20 ms, only the 2nd bit and the 3rd bit of the Least Significant Bit (LSB) of the SFN information in the MIB information within the same SSB are different in different synchronization signal periods within one TTI, and the half-frame indications are the same. The specific bits are (k3, k2, k1, k0)=(s2, s1, 0, 0). Since the 1st bit of the LSB and the half-frame indication bits are the same in different synchronization signal periods, the 1st bit of the LSB and the half-frame indication bit can be denoted as 0, indicating no difference.

In the case that the synchronization signal period is 40 ms, only the 3rd bit of the LSB of the SFN information in the MIB information within the same SSB is different in different synchronization signal periods within one TTI, and is denoted as (k3, k2, k1, k0)=(s2, 0, 0, 0). Since the 1st bit and the 2nd bit of the LSB and the half-frame indication bits are the same in different synchronization signal periods, the 1st bit, the 2nd bit and the half-frame indication bit of the LSB can be denoted as 0, which indicates no difference.

In the case that the synchronization signal period is 80 ms or 160 ms, the soft combination are not allowed, and there is no need to generate the mask sequence.

Figure 3:
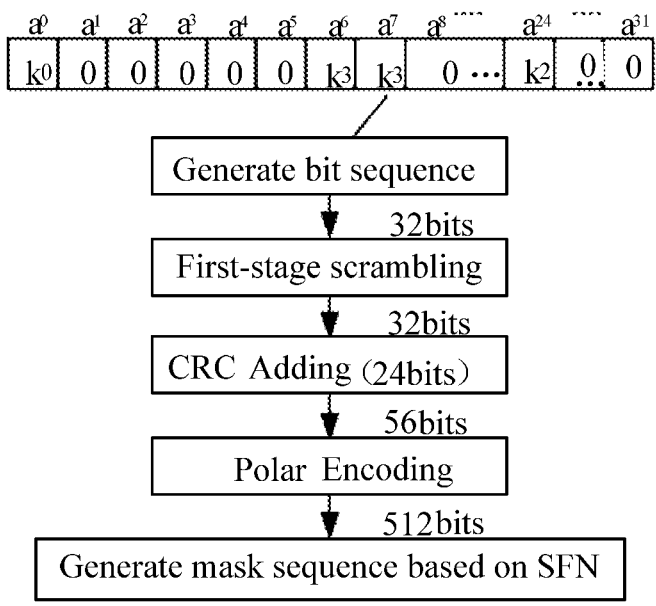
FIG. 3 is a schematic diagram illustrating a method for generating a mask sequence based on SFN information according to an embodiment of the disclosure.

FIG. 3 is a schematic diagram of a method for generating a mask sequence based on SFN information according to an embodiment of the disclosure. In this embodiment, a 32-bit sequence: a0, a1, . . . a31 is generated according to (k3, k2, k1, k0). As shown in FIG. 3, the bit sequence has a mapping relation with specific bits as follows: a0=k0, a6=k3, a7=k1, a24=k2. The remaining bits in the bit sequence are set to 0. The bit sequence a0, a1, . . . a31 is subjected to the first-stage scrambling. The bit sequence after the first-stage scrambling is added by the CRC, and then is Polar-encoded to generate the mask sequence. Taking the case where the synchronization signal period is 20 ms as an example, values of (k3, k2, k1, k0), the number of which is 4 in total, are traversed, and J=4 groups of mask sequences can be generated. The mask sequence has a length of N=512, and the mask sequences are recorded as $$d_j = d_0^j, d_1^j, \ldots, d_{N-1}^j,$$

wherein N=512, j=0:J−1.

In an embodiment, the blind detection method further includes:

Step 1112: generating the PBCH DMRS sequence according to each value of the lower 3 bit of the SSB index, or generating a PBCH DMRS sequence according to each value of the lower 2 bit of the SSB index and the half-frame indication bit, respectively, to obtain L PBCH DMRS sequences; and generating L second-stage scrambling sequences according to each value of the lower 3 bits of the SSB index or each value of the lower 2 bits of the SSB index.

In this embodiment, each candidate SSB index corresponds to a PBCH DMRS sequence and a second-stage scrambling sequence. For the L candidate SSB indexes, the L PBCH DMRS sequences can be obtained by using each of values of the lower 3 bits of the SSB index (L=8 values in total), or using each of values of the lower 2 bits of the SSB index and each of values of the half-frame indication bit (L=8 values in total). The L second-stage scrambling sequences are generated by using each of values of the lower 3 bits of the SSB index (L=8 values in total) or each of values of the lower 2 bits of the SSB index (4 values in total), and are used for calculating a group of LLR sequences for respective SSB candidate index. In an embodiment, Step 1120 further includes:

carrying out channel estimation and demodulation on a subcarrier position of the PBCH corresponding to the SSB in the target beam direction by adopting the PBCH DMRS sequence corresponding to respective candidate SSB index, to obtain an initial sequence corresponding to the respective candidate SSB index; and performing second-stage de-scrambling and rate de-matching on the initial sequence by adopting a second-stage scrambling sequence corresponding to the respective candidate SSB index to obtain the LLR sequences corresponding to the respective candidate SSB index.

In this embodiment, L=8 candidate SSB indexes are traversed, and for each candidate SSB index, a corresponding PBCH DMRS sequence is used to perform channel estimation and demodulation on a signal at the subcarrier position of the PBCH, so as to obtain L groups of initial sequences; and the second-stage de-scrambling and rate de-matching are performed by adopting the corresponding second-stage scrambling sequence to obtain the group of LLR sequences corresponding to each candidate SSB sequence. The initialization of the PBCH DMRS sequence is related to the lower 3 bits of the SSB index, or related to the lower 2 bits of the SSB index and 1 bit of the half-frame indication. The UE needs to generate L=8 PBCH DMRS sequences for channel estimation on PBCH. Results of the 8 channel estimations are equalized and demodulated to obtain L=8 groups of initial sequences; L=8 second-stage scrambling sequences are also generated for second-stage de-scrambling and de-rate matching for respective initial sequences. Thus, L groups of LLR sequences, which are desired to be de-masked, are obtained. Here the second-stage scrambling sequence of the PBCH is related to the lower 3 bits of the SSB index or to the lower 2 bits of the SSB index. On this basis, in Step 1120 of this embodiment, after performing second-stage de-scrambling and rate de-matching on each group of initial sequences, the UE obtains L groups of LLR sequences, which are denoted as $$r_l = r_0^l, r_1^l, \ldots, r_{N-1}^l, N = 512, l = 0:L-1.$$

In an embodiment, Step 1130 of the blind detection method includes:

performing exclusive or (XOR) operation on each group of the LLR sequences by adopting each group of mask sequences to obtain the J groups of de-masked sequences.

In this embodiment, in order to combine LLR sequences in different synchronization signal periods in a TTI, the LLR sequences need to be reversed to eliminate the influence of SFN information difference, and the L groups of LLR sequences (i.e., L groups of LLR sequences) are de-masked by using generated J groups of mask sequences based on SFN information. For the nth (n=1:J) synchronization signal period, the de-masking process can be expressed as:

$$r^{l,j} = r^l \times \left(1 - 2 \times d^{(n-1+j)\% J}\right), i = 0:N-1, l = 0:L-1, j = 0:J-1,$$

thus, L×J groups of de-masked sequences are obtained.

In an embodiment, Step 120 further includes:

accumulating the J groups of de-masked sequences corresponding to each of the candidate SSB indexes in each synchronization signal period with current LLR cache data, within one TTI.

In this embodiment, for the L×J groups of de-masked sequences, if the period of the sequences and the calculated current LLR cache data (stored as $LLR\_buffer^{l,j}$, l=0:L-1, j=0:J-1) within the same TTI, the L×J groups de-masked sequences and the current LLR cache data could be accumulated and combined. The combined L×J groups LLRs are stored as a new $LLR\_buffer^{l,j}$.

In an embodiment, Step 120 further includes:

under the condition that the nth synchronization signal period belongs to the next transmission time interval (TTI), updating the current LLR cache data to the J groups of de-masked sequences corresponding to each candidate SSB index in the synchronization signal period.

In this embodiment, for the L×J groups de-masked sequence, if the period of the sequences and the calculated current LLR cache data (stored as $LLR\_buffer^{l,j}$, l=0:L-1, j=0:J-1) are not within the same TTI, that is, the nth synchronization signal period satisfies with (n−1+j) % J=0 (wherein "%" represents a modulo operation), the current LLR cache data could be directly replaced with L×J groups de-masked sequences for storage and used as current LLR cache data of the next TTI for combining with de-masked sequences calculated in the next TTI.

In an embodiment, Step 130 further includes:

Step 1310: performing Polar-codes decoding on the combined sequence to obtain the decoding result;

Step 1320: performing Cyclic Redundancy Code (CRC) check on the decoding result;

Step 1330: in the case where the CRC check succeeds, performing a second check on the decoding result.

In this embodiment, Polar-codes decoding is performed on the result of combining the L×J groups of de-masked sequences and the current LLR cache data, and the decoding result is subjected to double checks to avoid a false detection and improve reliability of blind detection.

Specifically, the decoding result is subjected to the CRC check and the second check, respectively. For example, the CRC checking is performed first. And the second check will be performed if the CRC check is successful. If the two checks are both successful, it will indicate the PBCH blind detection is successful and the MIB can be extracted. If any one of checks is unsuccessful, it will indicate that the PBCH blind detection fails and the detection will proceed to the next synchronization signal period. The processes of de-masking, soft combining and decoding in the above embodiments are repeated until the two checks on the decoding result are successful. The second check is set according to the XOR operation of the de-masking process. Only when the bit sequence in the decoding result conforms to the XOR operation result of the de-masking process, the check could be considered as successful.

In an embodiment, the second check is successful if the decoding result satisfies a condition where all bits corresponding to the specific bits in the decoding result are 0, and bits of the decoding result are not all 0.

In the embodiment, the second check is based on the following principle: in the case that the specific bits (which belong to the lower 3 bits and the half-frame indication of the SFN information) are consistent with the corresponding bits in the bit sequence for generating the mask sequence, the corresponding bits in the decoding result should be 0 due to the XOR operation used in the de-masking process.

Specifically, there are 24-bit CRC in the decoding result for CRC check, and a sequence formed by the remaining bits except for CRC check is denoted as p0, p1, . . . , and p31. Taking the case where the synchronization signal period is 20 ms as an example, if (p6, p24)=(s2, s1)=(0,0) is satisfied and the bits other than p6 and p24 should not be all 0 (that is, the bits in the decoding result are not all 0), then the second check is successful.

Similarly, in the case where the synchronization signal period is 5 ms, if (p0, p6, p7, p24)=(c0, s2, s0, s1)=(0, 0, 0, 0) and the bits other than p0, p6, p7, and p24 should not all be 0 (that is, the bits in the decoding result are not all 0), the second check is successful.

In the case of a synchronization signal period of 10 ms, if (p6, p7, p24)=(s2, s0, s1)=(0,0,0) is satisfied and the bits other than p6, p7, and p24 should not all be 0 (i.e., the bits in the decoding result are not all 0), the second check is successful.

In the case where the synchronization signal period is 40 ms, if p6=s2=0 is satisfied and the bits other than p6 should not all be 0 (i.e., the bits in the decoding result are not all 0), the second check is successful.

In the case where the synchronization signal period is 80 ms and 160 ms, no de-masking operation is performed. Thus, the decoding result will not be subjected to the second check.

The checking process will be illustrated by an example. In the NR system, the TTI is 80 ms, the synchronization signal period is 10 ms, J=8 times of combination are required at most within a single TTI, and an SSB set includes Lmax=4 SSBs. When the j=5th group mask sequence (j=5) is used for the SSB index l=2, in the n=6th synchronization signal period, the check is successful, and the sequence consisting of bits other than the CRC in the decoding result are p0, p1, . . . , and p31.

In the case where the synchronization signal period is 10 ms, the SFN information in the MIB information within the same SSB in different synchronization signal periods only has different lower 3 bits (s2, s1, s0) of LSB, for the 3-bit SFN information index (s2, s1, s0) used for generating the 32-bit mask sequence, there are 8 values in total: 000, 001, 010, 011, 100, 101, 110, 111, which are sequentially denoted as $d^j$ (j=0:7).

For the n=6th synchronization signal period, the decoding result of the J=5th mask sequence is de-masked by using the mask sequence $d^{(n-1+J) \% J}$. For the case of (s2, s1, s0)=010, since the 3 bits are reversed and eliminated by the de-masking operation, the UE needs to judge whether the corresponding 3 bits in the decoding result is 0, that is, a successful condition of second check is that: p0, p1, ..., p31 are not all 0, and p6=0 and p7=0 and p24=0; otherwise, the second check fails.

In an embodiment, Step 140 further includes:

Step 1410: complementing the SFN information in the decoding result; and

Step 1420: extracting the MIB from the complemented decoding result.

In this embodiment, since SFN information is eliminated in the de-masking process, for the decoding result that being PBCH detection is successful, bits of SFN information used in the process of generating the corresponding mask sequence are complemented. On the basis, it is possible to obtain the accurate SFN information, accurately extract the MIB, and to realize the radio frame timing, half-frame timing, and time slot timing, so that the blind detection of PBCH information can be completed.

In an embodiment, Step 1410 further includes:

assigning values of the specific bits corresponding to the nth synchronization signal period and the jth mask sequence to corresponding bits in the decoding result, wherein n is an index of the synchronization signal period corresponding to the success of the check, and j is an index of the mask sequence corresponding to the success of the check.

In this embodiment: for the decoding result with successful check, the sequence consisting of bits other than CRC check is denoted as p0, p1, ..., p31, and the specific bits for generating the mask sequence can be determined according to the synchronization signal period. Taking the case where the synchronization signal period is 20 ms as an example, the specific bits for generating the 32-bit mask sequence are (s2, s1) of the SFN information, which have $2^2=4$ values: 00, 01, 10, 11. The generated 4 groups of mask sequences are sequentially marked as $d^j$ (j=0:3). A successful PBCH detection corresponds to the nth synchronization signal period and the jth mask sequence. In this case, the mask sequence $d^{(n-1+J) \% J}$ is used for the de-masking, and then the values of (s2, s1) corresponding to $d^{(n-1+J) \% J}$ is complemented to the corresponding bits in the decoding result: p6=s2 and p24=s1, i.e., MIB can be further extracted from p0, p1, ... and p31.

Similarly, in the case where the synchronization signal period is 10 ms, the specific bits are (s2, s1, s0), which have 23=8 values in total. The generated 8 groups of mask sequences are sequentially marked as $d^j$ (J=0:7). A successful PBCH detection corresponds to the nth synchronization signal period and the jth mask sequence. In this case, the mask sequence $d^{(n-1+J) \% J}$ is used for the de-masking, and then the values of (s2, s1, s0) corresponding to $d^{(n-1+J) \% J}$ is complemented to the corresponding bits in the decoding result: p6=s2, p7=s0, and p24=s1, i.e., MIB can be further extracted from p0, p1, ..., and p31.

In the case where the synchronization signal period is 5 ms, the specific bits are (s2, s1, s0, c0), which have $2^4=16$ values total. The generated 16 groups of mask sequences are sequentially marked as $d^j$ (j=0:15). A successful PBCH detection corresponds to the nth synchronization signal period and the jth mask sequence. In this case, the mask sequence $d^{(n-1+J) \% J}$ is used for the de-masking, and the values of (s2, s1, s0, c0) corresponding to $d^{(n-1+J) \% J}$ are complemented to the corresponding bits in the decoding result: p0=c0, p6=s2, p7=s0, and p24=s1, i.e., MIB can be further extracted from p0, p1, ..., and p31.

In the case where the synchronization signal period is 40 ms, the specific bit is s2, which has 2 values in total. The generated 2 groups of mask sequences are sequentially marked as $d^j$ (j=0:1). A successful PBCH detection corresponds to the nth synchronization signal period and the jth mask sequence. In this case, the mask sequence $d^{(n-1+J) \% J}$ is used for the de-masking, and then the values of (s2, s1, s0, c0) corresponding to $d^{(n-1+J) \% J}$ are complemented to the corresponding bits in the decoding result: p6=s2, i.e., MIB can be further extracted from p0, p1, ... and p31.

In the case where the synchronous signal period is 80 ms or 160 ms, no de-masking operation is performed. MIB can be directly extracted from the decoding result without being complemented.

The complementation process will be illustrated by way of an example. In the NR system, the TTI is 80 ms and the synchronization signal period is 5 ms. Only J=16 combinations at maximum are required at most within a TTI. An SSB set contains 64 SSBs. When the j=13th mask sequence is used for the SSB index l=6 in in the n=10th synchronization signal period, the check is successful, and the sequence consisting of bits other than the CRC in the decoding result are p0, p1, ..., and p31.

In the case where the synchronization signal period is 5 ms, the SFN information in the MIB information within the same SSB in different synchronization signal periods has different lower 3 bits (s2, s1, s0) of LSB and half-frame indication (c0). For the 3-bit SFN information index and the half-frame indication (s2, s1, s0, c0) used for generating the 32-bit mask sequence, there are 16 values in total: 0000, 0001, 0010, 0011, 0100, 0101, 0110, 0111, 1000, 1001, 1010, 1011, 1100, 1101, 1110, 1111, which are sequentially donated as $d^j$ (j=0:15).

For the n=10th synchronization signal period, the decoding result of the J=13th mask sequence is de-masked by using the mask sequence $d^{(n-1+J) \% J}$. For the case of (s2, s1, s0, c0)=0110, since the 4 bits are reversed and eliminated by the de-masking operation, the UE needs to complement the respective 4 bits in the decoding result. That is, the bits in the decoding result corresponding to the specific bits are assigned to: p0=c0=0, p6=s2=0, p7=s0=1, p24=s1=1, and the MIB information is extracted from the assigned p0, p1, ..., p31.

FIG. 4 is a flowchart of a blind detection method according to another embodiment of the disclosure. In this embodiment, a blind detection applying to all synchronization signal periods in a TTI will be taken as an example. If the PBCH detection is still unsuccessful after traversing each candidate SSB index for the SSB in the target beam direction in each synchronous signal period in a TTI and traversing each mask sequence under each candidate SSB index for de-masking, the blind detection will proceed to receive the PBCH information and enter the blind detection for the next TTI. As shown in FIG. 4, the blind detection method includes the following steps:

Step 201: traversing L=8 SSB indexes, and demodulating the SSB in the target beam direction to obtain L groups of initial sequences;

Step 202: performing second-stage de-scrambling and rate de-matching on the L groups of initial sequences, respectively, to obtain L groups of LLR sequences;

Step 203: traversing values of specific bits according to the TTI and the synchronization signal period to generate J groups of mask sequences based on the SFN information;

Step 204: adopting the J groups of mask sequences to de-mask the L groups of LLR sequences based on the SFN information, respectively, to obtain LxJ group de-masked sequences; and Step 205: judging whether the current synchronization signal period is in the same TTI as the current LLR cache data, wherein if yes, go to Step 206; otherwise go to Step 212.

In an embodiment, Step 205 can specifically include: judging whether the current synchronization signal period n satisfies (n−1+j) % J=0 wherein if not, go to Step 206; if yes, go to Step 212 without combination.

Step 206: combining the LxJ group de-masked sequences with the current LLR cache data, and storing the combined LxJ group de-masked sequences as new LLR cache data;

Step 207: decoding the LLR cache data (i.e., the combined LxJ groups de-masked sequence in Step 206 or the replacement LxJ groups de-masked sequence in Step 212);

Step 208: performing CRC check and second check on the decoding result;

Step 209: judging whether the CRC check and the second check are successful, wherein if yes, go to Step 210; otherwise proceed to Step 213;

Step 210: assigning values of specific bits corresponding to the mask sequence with successful check to respective bits in the decoding result so as to complement the SFN information in the decoding result;

Step 211: extracting MIB from the decoding result with the SFN information complemented to accomplish the blind detection of the PBCH information.

Step 212: replacing the current LLR cache data with the LxJ groups de-masked sequences, and storing the LxJ groups de-masked sequences as new (with respect to the next TTI) LLR cache data;

Step 213: proceeding to receive the PBCH information in the next synchronization signal period and repeating Steps 201 to 211.

It should be noted that, in Step 208, the decoding result is subjected to CRC check and second check. If both checks succeed, it will mean that the PBCH detection is successful; if either of checks fails, the blind detection will be carried out based on the next group of mask sequences (j=j+1, j≤J) or SSB indexes (l=l+1, l≤L); if the PBCH detection is still unsuccessful after traversing the LxJ groups of decoding results, then the next synchronous signal period (n=n+1, n≤J) will be entered for blind detection; and if the PBCH detection is still unsuccessful after entering the 2xJ synchronization signal period, it will mean that the PBCH detection fails.

In the blind detection method according to the above embodiment, the PBCH information received by the SSB aligned with the UE beam in different synchronization signal periods is demodulated within a TTI to obtain the LLR sequences, and then the LLR sequences are subjected to de-masking and combination to eliminate the difference of SFN information, thereby improving the signal-to-noise ratio of the PBCH demodulation. Moreover, the indexes of only 8 SSBs need to be traversed and at most 16 SFN information combinations need to be traversed for each SSB, so that at most 128 blind detection combinations are required. Therefore, there is no need to perform soft combination on different SSB sets and the SSBs in each SSB set, thereby reducing the number of the blind detection combinations and the complexity of PBCH demodulation and improving the blind detection efficiency. In addition, for the de-masking operation, in addition to the CRC check on the decoding result, the second check is also performed. The PBCH detection is considered as successful only when both checks succeed, thereby reducing the false detection probability of PBCH and improving the reliability of blind detection.

Figure 5:
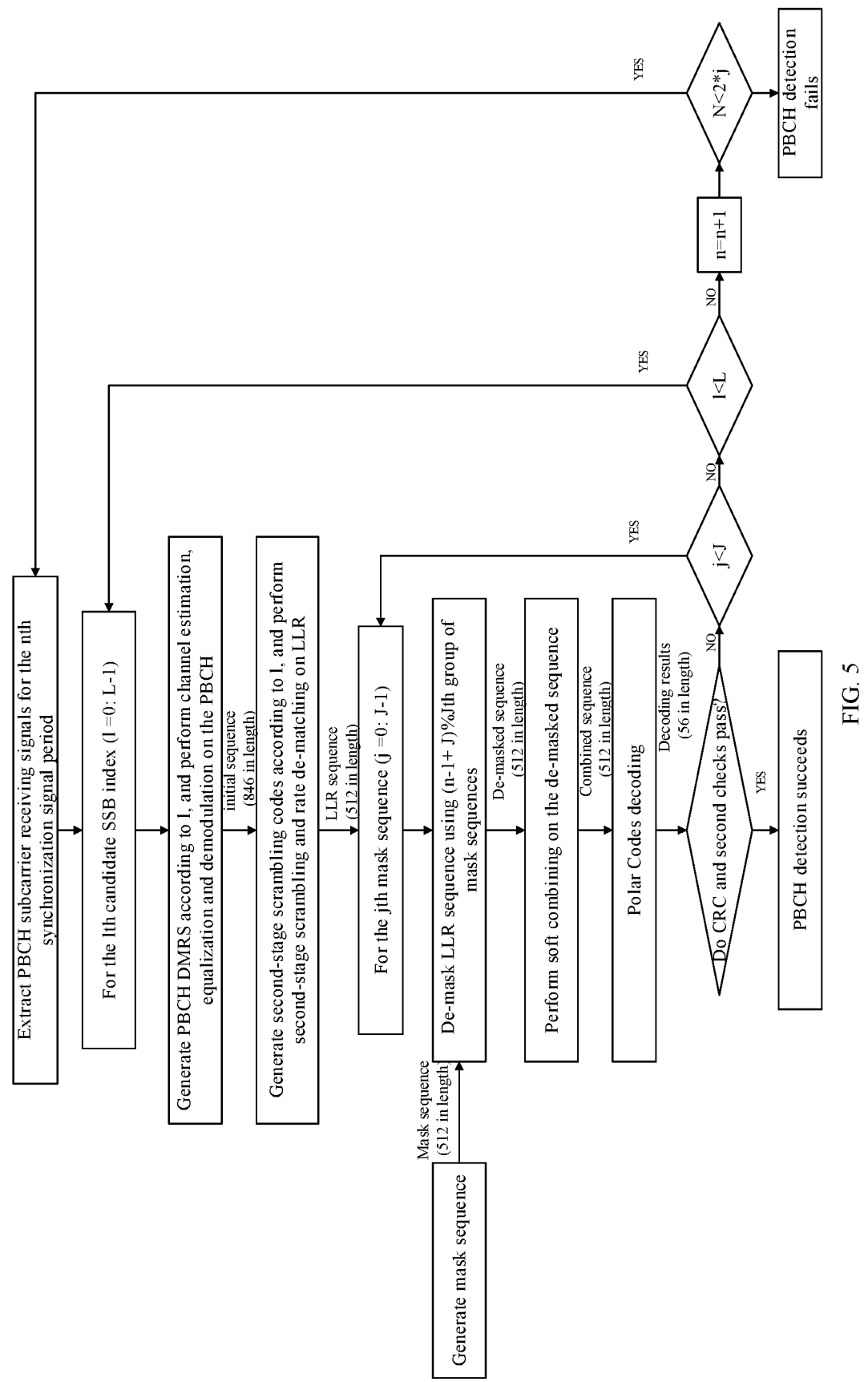
FIG. 5 is a schematic diagram illustrating an implementation of the blind detection method according to the embodiment of the disclosure.

FIG. 5 is a schematic diagram illustrating an implementation of a blind detection method according to an embodiment of the disclosure. In this embodiment, a blind detection scenario will be described in which the de-masking is performed in each synchronization signal period for each candidate SSB index by using each mask sequence within a TTI. If the check is successful under the condition that the de-masking is performed in the nth synchronization signal period for the lth candidate SSB index by using the jth mask sequence, the PBCH detection succeeds; otherwise, the three parameters need to be traversed until the PBCH detection is successful, or the blind detection is proceeded in the next TTI. As shown in FIG. 5, the blind detection method is implemented as follows:

Firstly, the PBCH subcarrier receiving signals is extracted for the nth synchronization signal period, and SSB indexes (l=0:L−1) are traversed according to the subcarrier position of the signal. L=8 PBCH DMRSs are generated for channel estimation, equalization and demodulation on the PBCH to obtain L=8 initial sequences with a length of 864.

Further, the SSB indexes (l=0:L−1) are traversed to generate L=8 second-stage scrambling codes for second-stage scrambling and rate matching on the initial sequence to obtain L=8 LLR sequences with a length of 512.

Further, the (n−1+J) % Jth group of the mask sequences is selected from the generated J groups of mask sequences (with the length of 512) to de-mask the LLR sequences to obtain at least one group of de-masked sequences with a length of 512.

Furthermore, the de-masked sequences are combined to obtain a combined sequence with a length of 512.

Then, Polar-codes decoding is performed on the combined sequence to obtain a decoding result with the length of 56.

Subsequently, the decoding result is subjected to a CRC check and second check. If the two checks are passed, PBCH detection is successful and SFN information can be complemented into the decoding result to extract the MIB. If neither of the two checks is passed, each group of mask sequences is traversed first to perform operations of de-masking, combining, decoding and checking until PBCH detection is successful.

When the PBCH detection is still unsuccessful after traversing the J groups of mask sequences, the L candidate SSB indexes is traversed to generate a corresponding LLR sequence through demodulation, second-stage de-scrambling and rate de-matching, and operations of de-masking, combining, decoding and checking are performed on the LLR sequence by adopting the J groups of mask sequences until the PBCH detection is successful.

If the PBCH detection is still unsuccessful after traversing the J groups of mask sequences and the L candidate SSB indexes, then the next synchronization signal period will be entered to re-extract the PBCH subcarrier receiving signal. And all the above operations are repeated until PBCH detection is successful.

If the PBCH detection is still unsuccessful after traversing $2 \times J$ synchronous signal periods, it will determine that the PBCH detection for the current TTI is failed.

Implementation processes of the blind detection method will be described below by way of an example:

In the NR system having a TTI of 80 ms, when a cell is initially accessed, a synchronization signal period is 20 ms, and an SSB set includes 8 SSBs (Lmax=8).

Before a PBCH demodulation, a physical cell identity and a symbol boundary of an SSB of a beam align with a UE are determined by detecting a primary synchronization signal and a secondary synchronization signal, and the UE does not know the index of the SSB in the initial synchronization process and needs to traverse the SSB indexes (l=0:7) from 0. J=4 times of combination are required at maximum within a TTI. In different periods, only SFN information in MIB information in the same SSB has different 2nd bit and 3rd bit of LSB, which are denoted as (s2, s1). Due to the TTI boundary of PBCH is unknown, all possibilities of particular bits, i.e., (s2, s1), are required to be traversed for each time of combination requires traversing, which have 4 values in total. At first, initialization n=1 is set, and the current LLR cache data $$\text{LLR\_Buffer}^{l,j}, i = 0{:}511, l = 0{:}L - 1, j = 0{:}J - 1$$

is cleared.

1) A mask sequence is generated. According to (s2, s1), a 32-bit sequence a=a0, a1, . . . , and a31 is generated, wherein a6=s2, a24=s1, and all other bits are set to 0. After the sequence a is subjected to a first-stage scrambling, 24-bit CRC adding and Polar-codes encoding, a mask sequence d=d0, d1, . . . , d511 is generated. There are 4 values in total for (s2, s1): 00, 01, 10, 11, and accordingly 4 groups of mask sequences can be generated, which are sequentially denoted as $d_j$ (j=0:3).
2) l=0 is set.
3) A local PBCH DMRS sequence and a second-stage scrambling sequence according to the SSB index l is generated, and perform channel estimation, equalization and demodulation on the received PBCH signal of the SSB in the nth synchronization signal period to obtain an initial sequence with a length of 864. Then the initial sequence is subjected to second-stage de-scrambling and rate de-matching to obtain an LLR sequence with a length of 512, which is denoted as r=r0, r1, . . . , and r511.
4) j=0 is set.
5) The LLR sequences obtained by the SSB indexes of l is de-masked by adopting the respective mask sequences $d^{(n-1+j)\ \%\ J}$ to generate new de-masked sequences $r^j$, and the de-masking process can be expressed as follows:

$$r_i^j = r_i^j \times \left(1 - 2 \times d_i^{(n-1+j)\% \ J}\right), i = 0{:}511.$$

6) The de-masked sequence $r^j$ and the current LLR cache data (stored in LLR\_Buffer$^{l,j}$) of the SSB index 1 obtained by calculation are accumulated to obtain new LLR cache data, which is a combined sequence. When n satisfies (n−1+j) % J=0, the combination operation is skipped and the de-masked sequence $r^j$ is directly stored into the LLR\_Buffer$^{l,j}$.
7) The combined sequence is subjected to Polar decoding to obtain a decoding result.
8) The decoding result is subjected to CRC check and second check. If both checks succeed, the PBCH detection is successful. If either of checks fails, then j=j+1 (the next group of mask sequences will be traversed).

In the case where j<J, then the steps 5) to 8) will be repeated. In the case where j=J, then l=l+1 (the next SSB index will be traversed).

In the case where l<L, then the steps 3) to 8) will be repeated. In the case where l=L, then n=n+1 (the next synchronization signal period will be entered).

If n<2×J, then the steps 2) to 8) will be repeated. If n=2×J, it indicates that PBCH detection fails for the current TTI.

In the blind detection process according to this embodiment, the times of the combination are 4 at maximum. Upon the combination, the signal-to-noise ratio can be improved by 6 dB. At most 32 groups of blind detection are required, thereby greatly reducing the complexity of PBCH demodulation.

Figure 6:
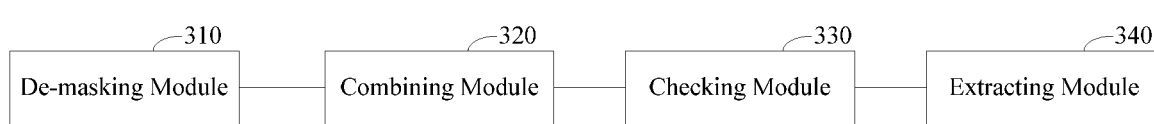
FIG. 6 is a block diagram illustrating a blind detection device according to an embodiment of the disclosure.

An embodiment of the disclosure also provides a blind detection device. FIG. 6 is a block diagram of a blind detection device according to the embodiment of the disclosure. As shown in FIG. 6, the blind detection device includes: a de-masking module 310, a combining module 320, a checking module 330, and an extracting module 340.

The de-masking module 310 is configured to de-mask PBCH information received by an SSB in a target beam direction in at least one synchronization signal period within a transmission time interval (TTI) according to system frame number (SFN information), to obtain at least one group of de-masked sequences.

The combining module 320 is configured to perform soft combination on the de-masked sequences to obtain a combined sequence;

The checking module 330 is configured to check a decoding result of the combined sequence.

The extracting module 340 is configured to, when the check succeeds, extract MIB from the decoding result according to the SFN information, so as to accomplish blind detection of the PBCH information.

The blind detection device of the embodiment can eliminate the difference between the PBCH information received by the SSB in different synchronization signal periods through de-masking, thereby implementing soft combination and improving the signal-to-noise ratio of information combination; and by means of the soft combination of the PBCH information received by the SSB in the target beam direction in a plurality of synchronous signal periods within one transmission time interval, the times of the combination and the number of the groups of blind detections can be reduced, thereby improving the efficiency of blind detection.

In an embodiment, the de-masking module 310 further includes:

a mask-sequence generating module, configured to generate J groups of mask sequences based on the SFN information according to the transmission time interval and the synchronization signal period, wherein J is a positive integer;

a candidate index determining module, configured to determine L candidate SSB indexes according to lower 3 bits of an SSB index, or determine L candidate SSB indexes according to lower 2 bits of an SSB index and a half-frame indication bit, where L is a positive integer, and each of the candidate SSB indexes corresponds to a PBCH DMRS sequence and a second-stage scrambling sequence;

an LLR calculating module, configured to calculate a group of LLR sequences for each of the candidate SSB indexes; and an information de-masking module, configured to adopt the J groups of mask sequences to de-mask the LLR sequences, respectively, to obtain J groups of de-masked sequences until the check succeeds.

In an embodiment, the mask sequence generating module is further configured to:

generate a bit sequence according to each value of specific bits, respectively, wherein the specific bits belong to the lower 3 bits of the SFN information and the half-frame indication bit; and performing first-stage scrambling, Cyclic Redundancy Check (CRC) adding and Polar-codes encoding on the bit sequence to obtain the corresponding J groups of mask sequences.

In an embodiment, the blind detection device further includes:

a DMRS sequence generating module, configured to generate a PBCH DMRS sequence according to each value of the lower 3 bits of the SSB index, or generate a PBCH DMRS sequence according to each value of the lower 2 bits of the SSB index and the half-frame indication bit, respectively, to obtain L PBCH DMRS sequences; and a second-stage scrambling sequence generating module, configured to generate L second-stage scrambling sequences according to each value of the lower 3 bits of the SSB index or each value of the lower 2 bits of the SSB index.

In an embodiment, the LLR calculating module is further configured to:

carry out channel estimation and demodulation at the PBCH subcarrier position corresponding to the SSB in the target beam direction by adopting the PBCH DMRS sequence corresponding to respective candidate SSB index to obtain an initial sequence corresponding to the respective candidate SSB index; and perform second-stage de-scrambling and rate de-matching on the initial sequence by adopting a second-stage scrambling sequence corresponding to the respective candidate SSB index to obtain an LLR sequence corresponding to the respective candidate SSB index.

In an embodiment, the information de-masking module is further configured to:

perform XOR on each LLR sequence by adopting the respective group of mask sequences to obtain at least one de-masked sequence.

In an embodiment, the combining module 320 is further configured to:

accumulate the J groups of the de-masked sequences corresponding to each candidate SSB index in each synchronization signal period with current LLR cache data, within one transmission time interval.

In an embodiment, the combining module 320 is further configured to:

under the condition that the nth synchronization signal period belongs to the next transmission time interval (TTI), update the current LLR cache data to the J groups of de-masked sequences corresponding to each candidate SSB index in the synchronization signal period.

In an embodiment, the checking module 330 further includes:

a decoding module, configured to perform polar-code decoding on the combined sequence to obtain a decoding result;

a first checking module, configured to perform a Cyclic Redundancy Code (CRC) check on the decoding result, and a second checking module, configured to perform a second check on the decoding result under the condition that the CRC check succeeds.

In an embodiment, the second check is successful if the decoding result satisfies a condition where: all bits corresponding to the specific bits in the decoding result are 0, and bits of the decoding result are not all 0.

In an embodiment, the extracting module 340 further includes:

a complementing module, configured to complement the SFN information in the decoding result; and a MIB extracting module, configured to extract MIB from the complemented decoding result.

In an embodiment, the complementing module is further configured to:

assign values of specific bits corresponding to the nth synchronization signal period and the jth mask sequence to respective bits in the decoding result, wherein n is an index of the synchronization signal period corresponding to the success of the check, and j is an index of the mask sequences corresponding to the success of the check.

The blind detection device proposed in this embodiment and the blind detection method applied to the second node proposed in the above embodiments belong to the same inventive concept. Reference can be made to any of the above embodiments for the technical details that are not described in detail in this embodiment. This embodiment has the same beneficial effects as the blind detection method applied to the second node.

The embodiment of the disclosure also provides a terminal. The blind detection method as described above applied to the terminal can be performed by a blind detection device, which can be implemented in software and/or hardware form and integrated in the terminal. The terminal can be a mobile device such as a mobile phone, a notebook computer and a tablet computer which can be able to communicate with the network side.

Figure 7:
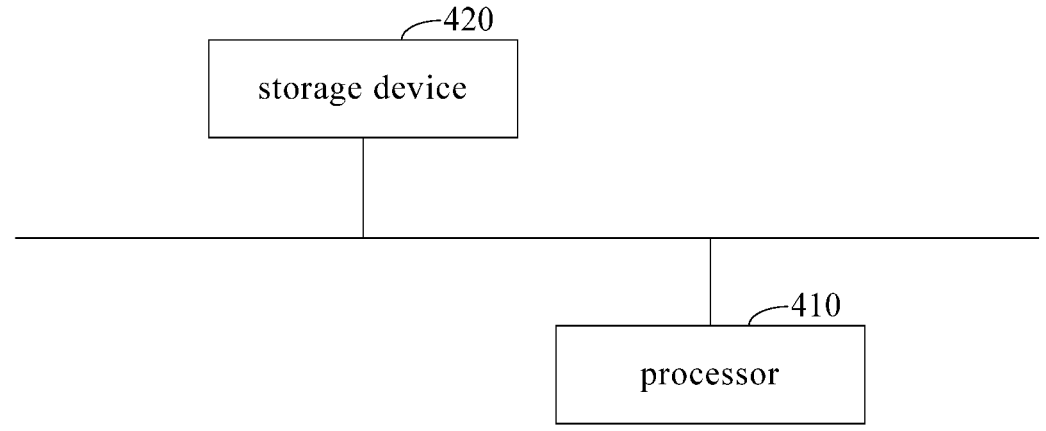
FIG. 7 is a schematic diagram illustrating a hardware structure of a terminal according to an embodiment of the disclosure.

FIG. 7 is a block diagram schematically showing a hardware structure of a terminal according to an embodiment of the disclosure. As shown in FIG. 7, the terminal according to this embodiment includes: a processor 410 and a storage device 420. At least one processor can be provided in the terminal. In FIG. 7, a single processor 410 is taken as an example. The processor 410 and the storage device 420 in the device can be connected through a bus or by any other means. The bus connection is taken as an example in FIG. 7.

At least one program is executed by the at least one processor 410, so that the at least one processor implements the blind detection method applied to the terminal according to any one of the embodiments described above.

The storage device 420 in the terminal is used as a computer-readable storage medium for storing the at least one program, which can be software programs, computer-executable programs, and modules, such as program instructions/modules corresponding to the blind detection method applied to the terminal in the embodiments of the disclosure (for example, the modules in the blind detection device as shown in FIG. 6 include the de-masking module 310, the combining module 320, the checking module 330, and the extracting module 340). The processor 410 executes various functional applications of the terminal and process data by operating the software programs, instructions and modules stored in the storage device 420, which can implement the blind detection method in the above-described method embodiments.

The storage device 420 mainly includes a program storage area and a data storage area, wherein the program storage area can store an operating system and at least one functional application program; the data storage area can store data created according to the use of the apparatus (such as, the de-masking sequence and the decoding result in the above-described embodiments). Further, the storage device 420 can include a high-speed random access memory, and can also include a non-volatile memory, such as at least one magnetic disk storage device, flash memory device, or other non-volatile solid state storage device. In some examples, the storage device 420 can further include a memory located remotely from the processor 410, which can be connected to the terminal over a network. Examples of such networks include, but are not limited to, the internet, intranets, local area networks, mobile communication networks, and combinations thereof.

When the at least one program included in the above terminal are executed by the at least one processor 410, the following operations are implement: de-masking PBCH information received through an SSB in a target beam direction in at least one synchronous signal period in a transmission time interval according to the SFN information, to obtain at least one group of de-masked sequences; performing soft combination on the de-masked sequences to obtain a combined sequence; checking a decoding result of the combined sequence; and extracting MIB from the decoding result according to the SFN information under the condition that the check succeeds, so as to accomplish the blind detection of the PBCH information.

The terminal proposed in this embodiment and the blind detection method or query method applied to the terminal proposed in the above embodiments belong to the same inventive concept. Reference can be made to any of the above embodiments for the technical details that are not described in detail in this embodiment. This embodiment has the same beneficial effects as the execution of the blind detection method.

An embodiment of the disclosure also provides a storage medium containing computer-executable instructions that, when executed by a computer processor, are operable to perform a method of blind detection. The method comprises the following steps: de-masking PBCH information received through an SSB in a target beam direction in at least one synchronous signal period in a transmission time interval according to the SFN information, to obtain at least one group of de-masked sequences; performing soft combination on the de-masked sequences to obtain a combined sequence; checking a decoding result of the combined sequence; and extracting MIB from the decoding result according to the SFN information under the condition that the check succeeds, so as to accomplish the blind detection of the PBCH information.

From the above description of the embodiments, those skilled in the art will appreciate that the present disclosure can be implemented by software and general hardware, and can also be implemented by hardware. Based on such understanding, the technical solution of the present disclosure may be embodied in the form of a software product, which may be stored in a computer-readable storage medium, such as a floppy disk, a Read-Only Memory (ROM), a Random Access Memory (RAM), a FLASH Memory (FLASH), a hard disk, or an optical disk of a computer, and includes a plurality of instructions to enable a computer device (which may be a personal computer, a server, or a network device, etc.) to perform the blind detection method according to any embodiment of the present disclosure.

Described above are only exemplary embodiments of the present disclosure, which are not intended to limit the scope of the present disclosure.

The block diagrams of any logic flows in the figures of this disclosure may represent program steps, or may represent interconnected logic circuits, modules, and functions, or may represent a combination of program steps and logic circuits, modules, and functions. The computer program may be stored in the memory. The memory may be of any type suitable to the local technical environment and may be implemented using any suitable data storage technology, such as, but not limited to, Read Only Memory (ROM), Random Access Memory (RAM), optical storage devices and systems (digital versatile disks, DVDs or CD disks), etc. The computer readable medium may include a non-transitory storage medium. The data processor may be of any type suitable to the local technical environment, such as but not limited to general purpose computers, special purpose computers, microprocessors, Digital Signal Processors (DSPs), Application Specific Integrated Circuits (ASICs), programmable logic devices (FGPAs), and processors based on a multi-core processor architecture.

The foregoing has provided by way of exemplary and non-limiting examples a detailed description of exemplary embodiments of the present disclosure. Various modifications and adaptations to the foregoing embodiments may become apparent to those skilled in the relevant arts in view of the accompanying drawings and the appended claims, without departing from the scope of the disclosure. Therefore, the proper scope of the present disclosure is defined by the appended claims.

What is claimed is:

1. A blind detection method, comprising:
de-masking Physical Broadcast Channel (PBCH) information received by a Synchronization Signal Block (SSB) in a target beam direction in at least one synchronization signal period within one Transmission Time Interval (TTI) according to J groups of mask sequences based on System Frame Number (SFN) information, to obtain at least one group of de-masked sequences, wherein J groups of mask sequences based on the SFN information is generated according to the TTI and the synchronous signal period based on the SFN information, wherein J is a positive integer;
determining a combined sequence according to the at least one group of de-masked sequences;
checking a decoding result of the combined sequence; and
responsive to determining that the check succeeds, extracting a Master Information Block (MIB) from the decoding result according to the SFN information so as to accomplish blind detection of the PBCH information.

2. The method according to claim 1, wherein the de-masking the PBCH information received by the SSB in the target beam direction in at least one synchronization signal period in the one TTI according to J groups of mask sequences based on the SFN information, to obtain the at least one group of de-masked sequences, further comprises:

determining L candidate SSB indexes according to lower 3 bits of an SSB index, or determining L candidate SSB indexes according to lower 2 bits of an SSB index and a half-frame indication bit, wherein L is a positive integer, and each of the candidate SSB indexes corresponds to a PBCH Demodulation Reference Signal (DMRS) sequence and a second-stage scrambling sequence;

calculating a group of Log-Likelihood Ratio (LLR) sequences for each of the candidate SSB indexes, respectively; and adopting the J groups of mask sequences to de-mask the LLR sequences, respectively, to obtain J groups of de-masked sequences until the check succeeds.

3. The method according to claim 2, wherein generating the J groups of mask sequences based on the SFN information according to the TTI and the synchronization signal period, comprises:

generating a bit sequence according to each value of specific bits, wherein the specific bits belong to the lower 3 bits of the SFN information and the half-frame indication bit; and performing first-stage scrambling, Cyclic Redundancy Check (CRC) adding and Polar-codes encoding on the bit sequence to obtain the J groups of mask sequences.

4. The method according to claim 2, further comprising:

generating the PBCH DMRS sequence according to each value of the lower 3 bit of the SSB index, or generating the PBCH DMRS sequence according to each value of the lower 2 bit of the SSB index and the half-frame indication bit, respectively, to obtain L PBCH DMRS sequences; and generating L second-stage scrambling sequences according to each value of the lower 3 bits of the SSB index or each value of the lower 2 bits of the SSB index.

5. The method according to claim 2, wherein the step of calculating the group of LLR sequences for each of the candidate SSB indexes, respectively comprises:

performing channel estimation and demodulation on a subcarrier position of the PBCH corresponding to the SSB in the target beam direction by adopting the PBCH DMRS sequence corresponding to each candidate SSB index, to obtain an initial sequence corresponding to each candidate SSB index; and performing second-stage de-scrambling and rate de-matching on the initial sequence by adopting a second-stage scrambling sequence corresponding to each candidate SSB index to obtain the LLR sequences corresponding to each candidate SSB index.

6. The method according to claim 2, wherein the adopting the J groups of mask sequences to de-mask the LLR sequences, respectively, to obtain the J groups of de-masked sequences, comprises:

performing XOR operation on each group of the LLR sequences by adopting each group of mask sequences to obtain the J groups of de-masking sequences.

7. The method of claim 2, wherein the determining the combined sequence according to the at least one group of de-masked sequences, comprises:

accumulating the J groups of the de-masked sequences corresponding to each of the candidate SSB indexes in each synchronization signal period with current LLR cache data, within one TTI.

8. The method according claim 2, wherein the determining the combined sequence according to the at least one group of de-masked sequences, comprises:

responsive to determining that the nth synchronization signal period belongs to the next TTI, updating the current LLR cache data to the J groups of de-masked sequences corresponding to each candidate SSB index in the synchronization signal period.

9. The method according to claim 1, wherein the checking the decoding result of the combined sequence, comprises:

performing Polar-codes decoding on the combined sequence to obtain the decoding result;

performing CRC check on the decoding result; and responsive to determining that the CRC check succeeds, performing second check on the decoding result.

10. The method according to claim 9, wherein the second check is successful if the decoding result satisfies a condition where all bits corresponding to the specific bits in the decoding result are 0, and bits of the decoding result are not all 0.

11. The method according to claim 1, wherein the extracting the MIB from the decoding result based on the SFN information, comprises:

complementing the SFN information in the decoding result; and extracting the MIB from the complemented decoding result.

12. The method according to claim 11, wherein the complementing the SFN information in the decoding result comprises:

assigning values of the specific bits corresponding to the nth synchronization signal period and the jth mask sequences to corresponding bits in the decoding result, wherein n is an index of the synchronization signal period corresponding to the success of the check, and j is an index of the mask sequence corresponding to the success of the check.

13. A blind detection device, comprising:

a constructor, configured to de-mask Physical Broadcast Channel (PBCH) information received by a Synchronization Signal Block (SSB) in a target beam direction in at least one synchronization signal period within one Transmission Time Interval (TTI) according to J groups of mask sequences based on System Frame Number (SFN) information, to obtain at least one group of de-masked sequences, wherein J groups of mask sequences based on the SFN information is generated according to the TTI and the synchronous signal period based on the SFN information, wherein J is a positive integer;

a combiner, configured to determine a combined sequence according to the at least one group of de-masked sequences;

a checker, configured to check a decoding result of the combined sequence; and a extractor, configured to, responsive to determining that the check succeeds, extract a Master Information Block (MIB) from the decoding result according to the SFN information, so as to accomplish blind detection of the PBCH information.

14. A terminal, comprising:

at least one processor; and a storage device, storing at least one program, wherein the at least one program, when executed by the at least one processor, causes the at least one processor to implement the blind detection method according to claim 1.

15. A non-transitory computer-readable storage medium, storing a computer program, wherein the program, when executed by a processor, implements the blind detection method according to claim 1.

* * * * *